United States Patent
Chettiar et al.

(10) Patent No.: US 11,398,735 B2
(45) Date of Patent: *Jul. 26, 2022

(54) ENERGY STORAGE SYSTEM AND METHOD TO IMPROVE BATTERY PERFORMANCE BASED ON BATTERY CONNECTIONS

(71) Applicant: Switching Battery Inc., Gilroy, CA (US)

(72) Inventors: Kannappan Karuppan Chettiar, Gilroy, CA (US); Veshant Chettiar, Gilroy, CA (US)

(73) Assignee: Switching Battery Inc., Gilroy, CA (US)

(*) Notice: Subject to any disclaimer, the term of this patent is extended or adjusted under 35 U.S.C. 154(b) by 228 days.

This patent is subject to a terminal disclaimer.

(21) Appl. No.: 16/574,218

(22) Filed: Sep. 18, 2019

(65) Prior Publication Data
US 2020/0112184 A1   Apr. 9, 2020

Related U.S. Application Data

(60) Provisional application No. 62/740,546, filed on Oct. 3, 2018.

(51) Int. Cl.
*H02J 7/00* (2006.01)

(52) U.S. Cl.
CPC .......... *H02J 7/0024* (2013.01); *H02J 7/0013* (2013.01); *H02J 7/0019* (2013.01)

(58) Field of Classification Search
CPC .......... H02J 7/0024; H02J 7/04; H02J 7/0063; H02J 2007/0067; H02J 2007/10;
(Continued)

(56) References Cited

U.S. PATENT DOCUMENTS 3,459,957 A    8/1969   Kelley
5,734,205 A    3/1998   Okamura et al.
(Continued)

FOREIGN PATENT DOCUMENTS

EP    2 980 953 A2    2/2016
EP    3 168 957 A1    5/2017
(Continued)

OTHER PUBLICATIONS

Electrical Engineering; "Wiring parallel and series simultaneously"; [online] URL; https://electronics.stackexchange.com/questions/269163/wiring-parallel-and-series-simultaneously/269188#269188; 2 pages.
(Continued)

*Primary Examiner* — Edward Tso
*Assistant Examiner* — Aaron Piggush
(74) *Attorney, Agent, or Firm* — Maier & Maier, PLLC (57) ABSTRACT

A battery system and method may be shown and described. Two or more batteries may be connected in an identical configuration to an output device. The batteries may be controlled by a control unit or logic chip which may be configured to operate in two phases. In the first phase, the two or more batteries may be connected in series. In the second phase, the two or more batteries may be connected in parallel. Switches may be connected to the positive and negative terminals of the batteries to switch the configuration from series to parallel, and vice-versa. A control unit may switch between the two phases at any desirable frequency to produce a desired output voltage and amperage. The switching speed between the two phases may be any number of rotations per second.

18 Claims, 4 Drawing Sheets

(58) Field of Classification Search
CPC .. H02J 7/125; H02J 7/00712; H02J 7/007188; H02J 7/342; H02J 7/0034; H02J 7/0027; H02J 7/025; H02J 7/0042; H02J 7/007; H02J 7/0047; H02J 7/0021; H02J 7/027; H02J 7/1461; H02J 7/166; H02J 7/0068; H02J 7/0054; H02J 7/0022; H02J 7/0026; H02J 7/0013; H02J 7/0019
USPC .................................. 320/117, 118, 121, 158
See application file for complete search history.

(56) References Cited

U.S. PATENT DOCUMENTS

| | | | |
|---|---|---|---|
| 5,994,965 A | 11/1999 | Davis et al. | |
| 7,489,048 B2 | 2/2009 | King et al. | |
| 10,044,069 B2* | 8/2018 | Despesse | B60L 58/12 |
| 10,106,110 B1 | 10/2018 | Ganiere | |
| 2014/0077764 A1* | 3/2014 | Brun-Buisson | H01M 10/425 320/117 |
| 2016/0036251 A1 | 2/2016 | Ma | |
| 2016/0134148 A1* | 5/2016 | Ide | H02J 7/0024 307/52 |
| 2016/0144722 A1* | 5/2016 | Arumugam | F03D 9/32 290/45 |
| 2016/0211682 A1 | 7/2016 | Chien | |
| 2016/0219664 A1* | 7/2016 | Ellenberger | H02J 7/0021 |
| 2017/0170671 A1* | 6/2017 | Mergener | H02J 7/0045 |
| 2018/0345806 A1* | 12/2018 | Lee | B60L 11/1824 |
| 2019/0176650 A1 | 6/2019 | Wood et al. | |
| 2019/0288528 A1* | 9/2019 | Greetham | H01M 10/0445 |
| 2019/0288536 A1* | 9/2019 | Gotz | H02J 7/0031 |
| 2019/0342979 A1* | 11/2019 | Liu | H05B 37/0272 |
| 2020/0086761 A1* | 3/2020 | Hamada | B60L 58/12 |
| 2020/0274370 A1 | 8/2020 | Krieg | |
| 2021/0218251 A1* | 7/2021 | Chettiar | H02J 7/0068 |

FOREIGN PATENT DOCUMENTS

| | | |
|---|---|---|
| JP | 5070793 B2 | 11/2012 |
| WO | 2012/063385 A1 | 5/2012 |
| WO | 2017/102414 A1 | 6/2017 |

OTHER PUBLICATIONS

Notification of Transmittal of the International Search Report and the Written Opinion of the International Searching Authority dated Jan. 2, 2020, in connection with corresponding international Application No. PCT/US19/54249 (8 pgs.).

Search Report dated Mar. 23, 2022 in corresponding European Application No. 19868765.9; 8 pages.

* cited by examiner

ENERGY STORAGE SYSTEM AND METHOD TO IMPROVE BATTERY PERFORMANCE BASED ON BATTERY CONNECTIONS

CROSS-REFERENCE TO RELATED APPLICATION

The present patent application claims benefit and priority to U.S. Provisional Patent Application No. 62/740,546 entitled "Battery connection system and method to improve performance" filed on Oct. 3, 2018 which is hereby incorporated by reference into the present disclosure.

FIELD

An energy storage system and a method to improve performance of batteries may be shown and described.

BACKGROUND

Series and parallel connections are commonly known in the field of electronics. Each type of connection has its own types of advantages and disadvantages and are utilized for various purposes. Multiple power supplies arranged in series may have a larger voltage, whereas multiple power sources in parallel may increase the amperage but not the voltage.

For example, two 12V and 100 Ah batteries connected in series may have an output of 24V and 100 Ah. Comparatively, the same two batteries connected in parallel may have an output of 12V and 200 Ah. Thus, if these batteries were powering a device, the device can be powered with double the voltage (24V compared to 12V) in series, or, alternatively, the device may be powered at the same 12V voltage but for twice as long in parallel (200 Ah instead of 100 Ah).

Further, typical batteries or energy storage systems may not be charged and discharged simultaneously. Thus, they may not be able to drive a load while also receiving charge. This can be problematic when an energy storage system is used with a renewable source. These systems often require a central controller to control the charging and discharging of the system.

SUMMARY

A battery system and method may be shown and described. Two or more batteries may be connected in an identical configuration to an output device. The batteries may be controlled by a control unit or logic chip which may be configured to operate in two phases.

In the first phase, the two or more batteries may be connected in series. The negative terminal of the first energy storage unit may be connected to the positive terminal of the second energy storage unit, and the positive terminal of the first energy storage unit may be connected to the negative terminal of the second energy storage unit as well as the output device.

In the second phase, the two or more batteries may be connected in parallel. The positive terminals of all the batteries may be connected to one another, and the negative terminals may be connected to one another. The positive and negative terminals in a parallel connection may then connect to the output source in the same parallel manner.

Then, the control unit may switch between the two phases at any desirable frequency to produce a desired output voltage and amperage. The switching speed between the two phases may be any number of rotations per second.

BRIEF DESCRIPTION OF THE FIGURES

Advantages of embodiments of the present invention will be apparent from the following detailed description of the exemplary embodiments thereof, which description should be considered in conjunction with the accompanying drawings in which like numerals indicate like elements, in which.

DETAILED DESCRIPTION

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the invention", "embodiments" or "invention" do not require that all embodiments of the invention include the discussed feature, advantage or mode of operation.

An electric circuit with the advantages of both series and parallel circuits may be shown and described in exemplary embodiments described herein. By quickly switching between a series and parallel configuration, the circuit may output an average of the series and parallel outputs. The output of the switching circuit may be adjusted by adjusting the phase frequency, or amount of time between switches. A higher voltage may be achieved by increasing the amount of time the circuit is in the first phase, when the circuit is in a series configuration. Alternatively, a higher amperage may be achieved by increasing the amount of time the circuit is in the second phase, when the circuit is in a parallel configuration. A higher voltage may be desirable for circuits powering larger loads, or a higher amperage may be desirable in order to increase the amount of time a load is powered from a battery. Since a circuit could be supplying electricity to any one of multiple types of loads, it may be desirable to alter the voltage or amperage, depending on the load.

Figure 1A:
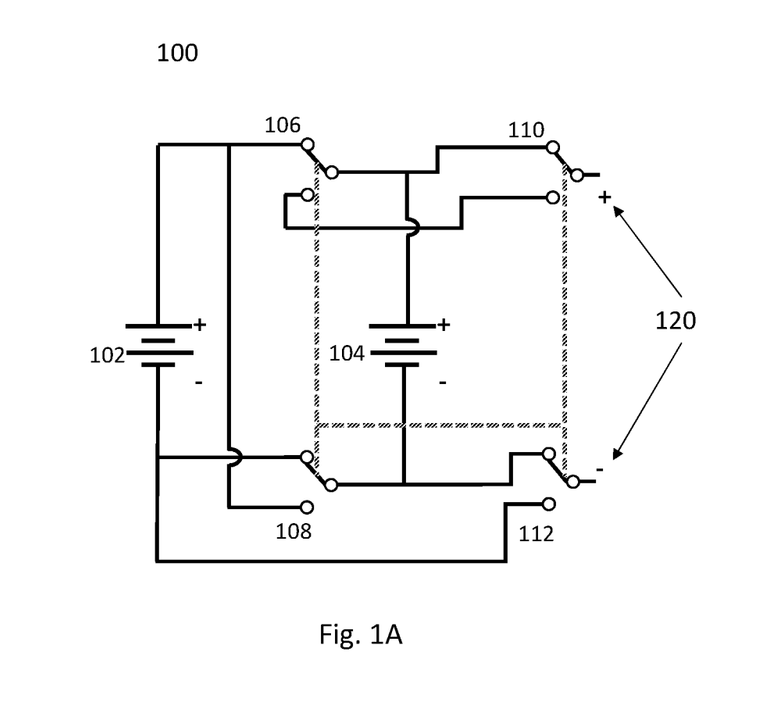
FIG. 1A is an exemplary embodiment of an energy storage system.

Referring now to exemplary FIG. 1A, a switching circuit may be shown in a parallel configuration. Two energy storage units, in this exemplary embodiment a first battery 102 and a second battery 104, may be connected by a set of switches. In this exemplary embodiment, these batteries may be wet-cell lead acid batteries of 12 volts and 100-amp hours each. The positive and negative terminals of each battery may be connected to switches. Switch 106 may permanently connect to the positive terminal of battery 104 and may connect to the positive terminal of battery 102 in the parallel phase. Thus, there may be a node at switch 106 connecting the positive terminals of battery 102, battery 104, and the positive terminal of the output.

Still referring to the parallel phase in exemplary FIG. 1A, an additional switch 108 may connect to the negative terminal of battery 104. During the parallel phase, switch 108 may be configured to connect to the negative terminal of battery 102. Thus, there may be a node at switch 108 connecting the negative terminals of the batteries 102 and 104. Further, the output may be connected to switches 110 and 112. In the parallel phase, switch 110 may be configured to connect the output 120 to the node created by the positive terminals of battery 102 and battery 104. At the same time, switch 112 may be configured to connect the negative terminal of output 120 to the node created by the negative terminals of battery 102 and battery 104. Thus, the positive terminals of the batteries and the positive terminal of the output are all connected, and the negative terminals of the batteries and the negative terminal of the output are also connected, and a parallel circuit may be formed.

Figure 1B:
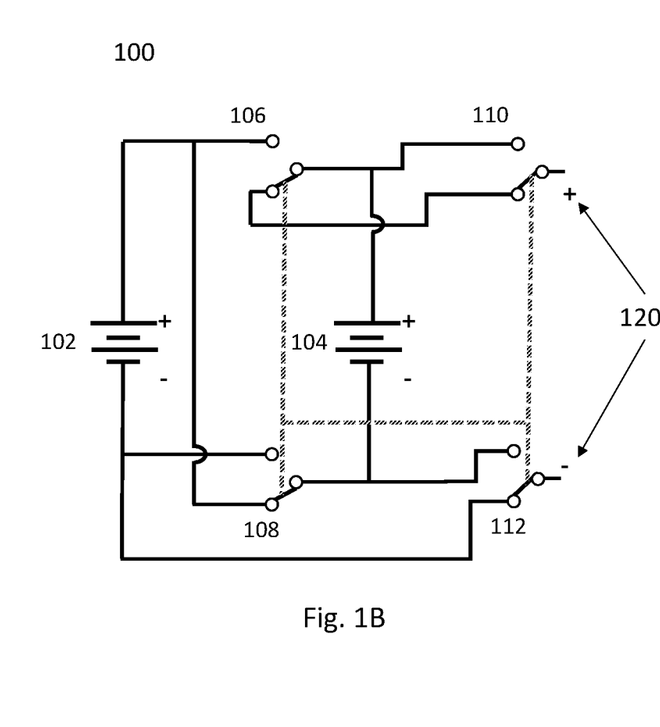
FIG. 1B is an exemplary embodiment of an energy storage system.

Now referring to exemplary FIG. 1B, the circuit may be shown in a series configuration. The series configuration may take place in a different phase than the parallel configuration. In the series configuration, the switches 106, 108, 110, and 112 may all be switched in the opposite direction of the previous phase. The switches may be connected such that they may switch simultaneously. To form the series configuration, switch 106 and switch 110 may connect the positive terminal of battery 104 directly to the output 120. The negative terminal of battery 104 may be connected to the positive terminal of battery 102, via switch 108. The negative terminal of battery 102 may be connected to the output 120 via switch 112. The switches may be any one of many types of switches or interrupters. The switches may be flipped, or commuted, at the same time. The output signals (current and voltage) may depend on the commuting or switching time between the two phases.

Figure 2:
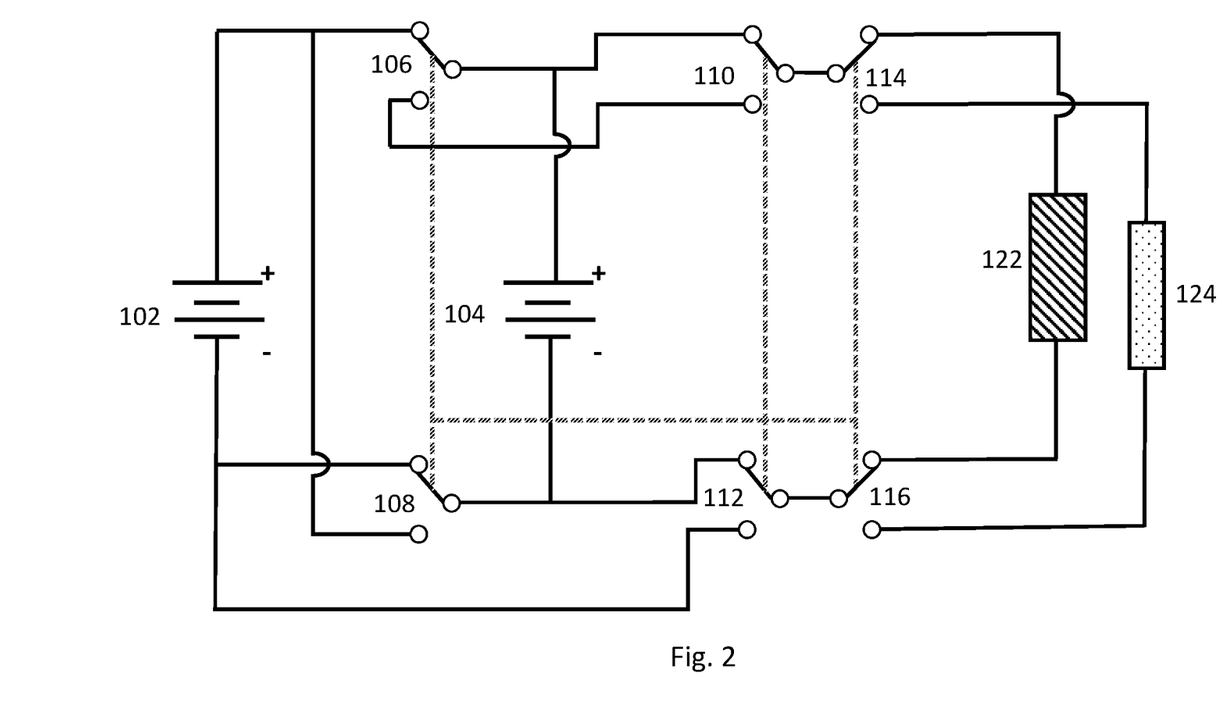
FIG. 2 is an exemplary embodiment of an energy storage system.

Referring now to exemplary FIG. 2, an electrical assembly may be shown with an output 122 which may be configured to connect to the circuit only during the series phase, and another output 124 which may be configured to connect to the circuit only during the parallel phase. This may be accomplished using the switches 114 and 116, which may be configured to switch at the same time as the other switches.

Still referring to the exemplary embodiment in FIG. 2, the secondary output 124 may be disconnected from the circuit during the parallel phase. If, for example, the output 124 is an energy storage system that is charging from the switching circuit 100, it may continue to operate normally during the parallel phase and may be charged only in the series phase.

An exemplary embodiment for the purposes of analysis, such as the embodiment in FIG. 2, may include a battery or batteries with a nominal voltage value of $V_n$ and nominal current value of $I_n$. The load of output 122 during the parallel phase may be $$Z_{parallel} = (2*V_n)/I_n.$$

In an exemplary embodiment, $t_1$ may be the time spent in a first, parallel phase and $t_2$ may be the time spent during the second, series phase. Further, the time T may represent the period corresponding to the fundamental frequency, so $T = 1/$ fundamental frequency $= t_1 + t_2$. If f(t) may represent the input signal, the mean value of a signal may then be calculated using the formula:

$$\text{Mean}(f(t)) = \frac{1}{T} \int_{(t-T)}^{t} f(t) \cdot dt \quad \text{(Equation 1)}$$

Figure 3A:
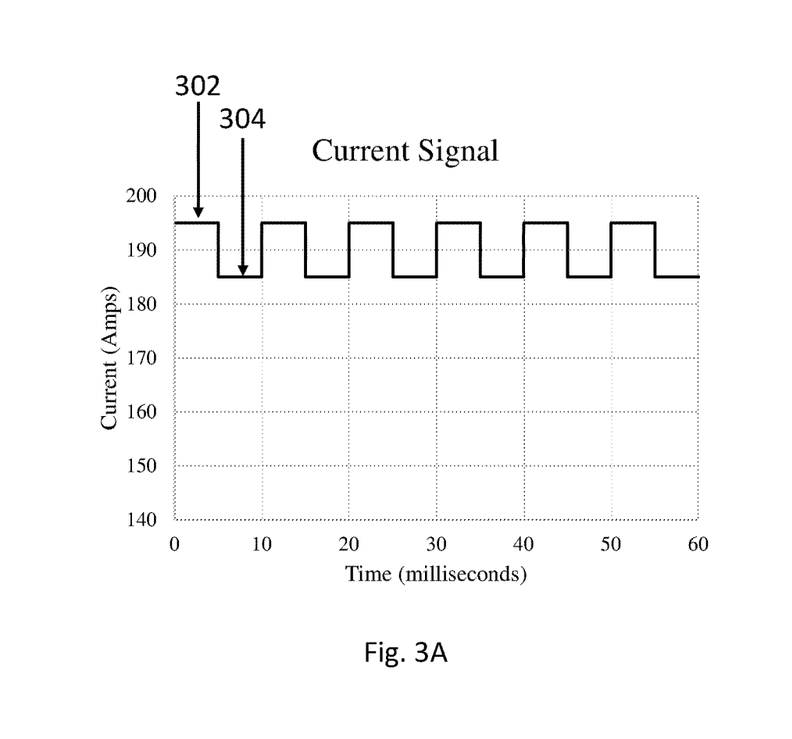
FIG. 3A is an exemplary embodiment of an output current signal waveform.
Figure 3B:
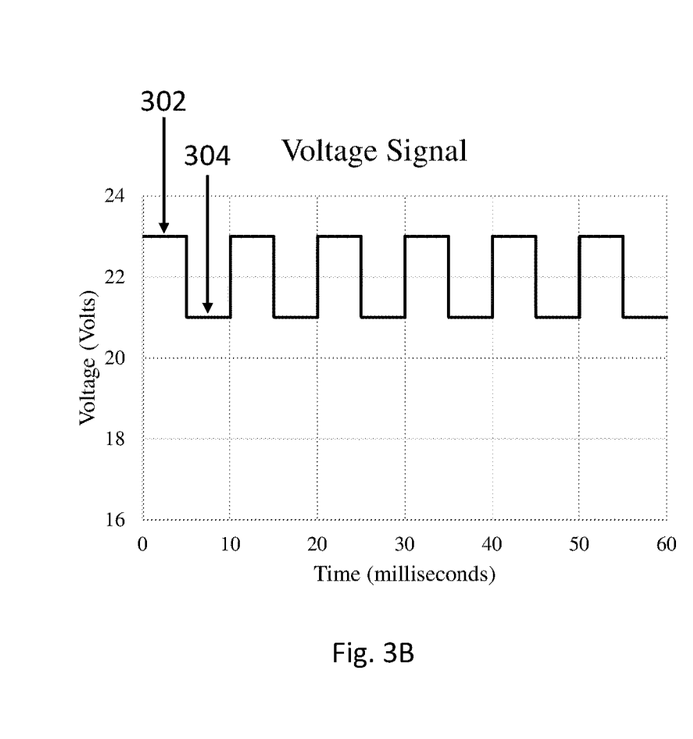
FIG. 3B is an exemplary embodiment of an output voltage signal waveform.

This formula may produce an exemplary output signal as shown in exemplary FIG. 3. The output signal, as illustrated in FIG. 3, may be a square signal. FIG. 3A may be the output of an exemplary current signal. FIG. 3B may be the output of an exemplary voltage signal. The width of the horizontal line 302 may correspond to the time $t_1$. The width of horizontal line 304 may correspond to the time $t_2$. Further, the integral of the current (I) of the exemplary signal may produce the following equations:

$$\frac{1}{T} \int_{0}^{t_1} I_1 \cdot dt + \frac{1}{T} \int_{t_1}^{t_1+t_2} I_2 \cdot dt \quad \text{(Equation 2)}$$

$$= \frac{1}{T} \cdot I_1 \cdot t_1 + \frac{1}{T} \cdot I_2 \cdot t_2 \quad \text{(Equation 3)}$$

The integral of the voltage signal may be:

$$\frac{1}{T} \int_{0}^{t_1} V_1 \cdot dt + \frac{1}{T} \int_{t_1}^{t_1+t_2} V_2 \cdot dt \quad \text{(Equation 4)}$$

$$= \frac{1}{T} \cdot V_1 \cdot t_1 + \frac{1}{T} \cdot V_2 \cdot t_2 \quad \text{(Equation 5)}$$

Additionally, there may be a case where $t_1 = t_2$. In this exemplary case, the mean value of the current may be found by the following equation: $(I_1 + I_2)/2$, and the mean value of the voltage may be found by: $(V_1 + V_2)/2$.

In the previously described exemplary embodiment, each battery may have a nominal current of 100 A and a nominal voltage of 12V. The combined voltage when the circuit is in series may be 24V and the combined current when the circuit is in parallel may be 200 A. As a result, the current mean value may be 150 A and the voltage mean value may be 18V when the circuit is switching between the first phase and the second phase at an equal rate, i.e. the first phase and the second phase are of equal lengths of time. In another exemplary embodiment, the time spent in the parallel phase ($t_1$) and the time spent in the series phase ($t_2$) may be altered such that they are unequal. For example, if $t_1$ is two-thirds (⅔) of the cycle, and the same nominal voltage and current is used, the current mean value may be 166.666 A and the voltage mean value may be 16V. Alternatively, if $t_1$ is one-third (⅓) of the cycle, the current mean value may be 133.3333 A and the current mean voltage may be 20V. Any ratio of $t_1$ to $t_2$ may be used to achieve a desired result.

In a further exemplary embodiment, the circuit may be adjusted by a control unit capable of altering the frequency of the phases. The control unit may be able to set the switching speed or the switching time between the two phases. The switching time may be the amount of time spent in each phase. The control unit may select a switching time based on rotations per second, or any other measurement of time. There may be any number of switches or rotations per second, from 1 to infinity. The control unit may configure the circuit to be in one phase much longer than the other phase.

The phases may not be in equal lengths. By changing the relative proportion of time spent in the phases, the output signal may be altered. Additionally, the control unit may be set to initially keep the circuit in a specific state. For example, the control unit may be configured to start in the parallel phase until the energy storage units become fully charged. The control unit may then begin the cycle of switching.

The batteries may be connected to an energy source. The circuit may be configured such that the batteries are connected in series during a first phase, during which they may be connected to a load and may be discharging. Then, during a second phase, the batteries may be connected in parallel as well as to the energy source which may charge the batteries during this phase. Thus, the batteries may discharge during the first series phase and charge during the second parallel phase. During the first cycle, the battery may discharge a small amount of energy. Further, during the second cycle a similarly small amount of energy may be charged to compensate for the energy lost during the first cycle. This may improve battery performance.

The energy source may be chosen to have a larger current output so that a larger amount of energy is charged to the battery during the parallel phase. In an exemplary embodiment, the amount of charge from the energy source during the parallel phase may exceed the amount of charge discharged by the load during the series phase, so the batteries may gain charge over time. It may be contemplated that when the battery reaches a certain level, the excess charge is prevented from reaching the battery in order to reduce the risk of overcharging. In an alternate embodiment, an energy source may be chosen which charges an amount of energy equal to the amount discharged during the series phase. In this alternate exemplary embodiment, the energy storage units may constantly hold the same amount of charge.

Additionally, by charging and discharging the batteries during these short cycles, the circuit may have the effect of charging and discharging the batteries or energy storage systems at the same time. Typical batteries or circuits cannot charge and discharge simultaneously and instead may utilize a central controller to manage the charge and discharge cycles. Typical energy sources may be connected directly to the load or connected to an energy storage system but may not be connected to both. As a result, the energy source may be configured to either charge a battery or to drive a load, but not both. An exemplary embodiment of a simultaneous series and parallel circuit as described here may be configured such that an energy source is connected to an energy storage system which then may drive a load at the same time. The load may draw power from the battery during a first phase and the energy storage system may charge during the second phase.

The energy source may be any type or combination of energy sources. In an exemplary embodiment, a renewable energy source may be used, although it is envisioned that other energy sources may be utilized, as desired.

Figure 4:
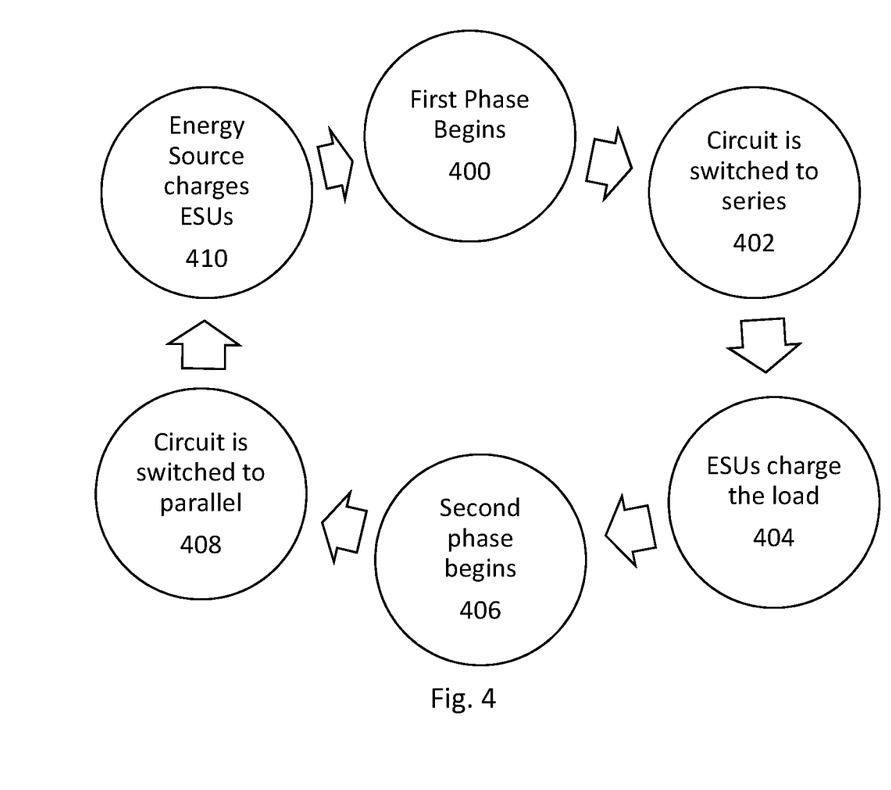
FIG. 4 is an exemplary embodiment of a method of implementing a switching circuit.

Now referring to exemplary FIG. 4, a method for implementing a switching circuit, such as the circuit in FIG. 2, may be shown. In a first step, the first phase may begin 400. The control unit may begin the first phase by sending a signal to the switches. In the next step, the switches may be flipped 402 such that the circuit is switched to a series configuration. The control unit may flip the switches simultaneously. The switches may be connected to one another such that they are flipped at the same time. In a third step, the energy storage units (ESUs) may charge the load 404. The load may be a rechargeable power source.

In a fourth step, the second phase may begin 406. The control unit may be configured to start the second phase after a certain amount of time, depending on how long the first phase is. The first phase and second phase may be of different durations. In a next step, the switches may be flipped 408. During this step, the switches may be flipped to the opposite position that they were flipped to in step 402. The switches may be flipped such that the ESUs and the load are connected in a parallel configuration. In a final step, the energy source may charge the ESUs 410. In an alternate embodiment, the ESUs may continue discharging during the $2^{nd}$ cycle, in the parallel phase. In this exemplary embodiment, the control unit may configure the ESUs to continue discharging so that they are connected to the load during both phases. The energy source may be connected to a switch which connects the energy source to the circuit during the second phase and connects the load to the circuit during the first phase. This switch may also be controlled by the control unit and may be flipped at the same time as the other switches. After a predetermined period of time, the first phase may once again begin 400 and a new cycle may start.

Although the previous examples may implement a switching circuit involving two batteries, it may be contemplated that the batteries may instead be any component that a user desires to be switched between series and parallel. Further, two batteries were used in the previous examples for the sake of clarity, but any number of batteries may be interconnected in a similar manner. The additional batteries may be configured to operate in additional (more than two) phases. The output may be any desirable output, such as another battery, an energy storage system, or any other electrically connected component capable of receiving an input.

In an exemplary embodiment, the switching circuit may be implemented in an electric vehicle. The switching circuit may be configured such that the electric vehicle is powered during one phase and disconnected and charging during the other phase. In an exemplary embodiment, the same amount of energy discharged during the first phase may be charged during the second phase. During the powered phase, the battery may expend additional energy to compensate for the energy lost during the unpowered phase. However, since the battery may be activated for half the time (one out of two phases as opposed to a constant output), efficiency may be increased.

Further, the switching circuit may allow for multiple sources of energy to be used simultaneously. For example, an electric vehicle powered by photovoltaic cells may be charged using an alternate source of energy (such as wind, gas, etc.) during solar intermittencies.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

The invention claimed is:

1. A system for connecting batteries in an electrical circuit, comprising:

a first energy storage unit with a positive terminal and a negative terminal,
a second energy storage unit with a positive terminal and a negative terminal,
a series configuration output and a parallel configuration output, and
a control unit that regulates a cycle comprising a first phase and a second phase,
wherein during the first phase, the negative terminal of the first energy storage unit is connected to the positive terminal of the second energy storage unit, while the positive terminal of the first energy storage unit and the negative terminal of the second energy storage unit are connected to the series configuration output, such that the first energy storage unit, second energy storage unit, and series configuration output are connected in a series connection; and
wherein during the second phase, the positive terminal of the first energy storage unit is connected to the positive terminal of the second energy storage unit while the negative terminal of the first energy storage unit is connected to the negative terminal of the second energy storage unit and both the positive terminals are connected to the parallel configuration output and the negative terminals are connected to the parallel configuration output, such that the first energy storage unit, second energy storage unit, and parallel configuration output are connected in parallel; and
a plurality of switches connected to the positive and negative terminals of the energy storage units, such that the switches configure the circuit in a series configuration during the first phase, and then in a parallel configuration during the second phase;
wherein the control unit sets the relative duration of the first phase and the relative duration of the second phase, such that the first phase comprises 0% to 100% of the duration of the cycle, and the second phase comprises the remainder of the cycle, such that the control unit alters the relative duration of the series configuration output and the parallel configuration output, and
wherein an output of the output terminal is determined as a weighted average between the series configuration output and the parallel configuration output, wherein the weighted average is weighted based on the relative duration of the first phase and the relative duration of the second phase.

2. The system of claim 1, wherein the control unit is one of a programable mechanical, electronic, PCB or integrated circuit chip.

3. The system of claim 1, wherein the series configuration output comprises a load and the parallel configuration output comprises an energy source.

4. The system of claim 1, wherein the first energy storage unit and the second energy storage unit each comprise a plurality of batteries.

5. The system of claim 1, wherein the duration of the first phase is equal to the duration of the second phase.

6. The system of claim 1, wherein the first energy storage unit and the second energy storage unit are capacitors.

7. The system of claim 1, further comprising a rechargeable power source connected to the output,
wherein during the second phase the control unit further connects the positive terminals of the first and second energy storage units to a positive terminal on the rechargeable power source and the negative terminals of the energy storage units to a negative terminal on the rechargeable power source, such that the rechargeable power source is connected to and receiving charge from the circuit using a parallel connection.

8. The system of claim 7, wherein during the first phase the rechargeable power source is disconnected from the circuit and is instead configured to drive a load.

9. The system of claim 8, wherein an amount of energy is lost from the first energy storage unit and second energy storage unit to the load during the first phase, and then recharged to the rechargeable power source from the electric circuit during the second phase.

10. The system of claim 1, wherein the plurality of switches are connected to one another such that they are all activated simultaneously.

11. The system of claim 1, wherein the control unit controls the plurality of switches.

12. The system of claim 1, wherein the first energy storage unit and the second energy storage unit are initially fully charged.

13. The system of claim 1, wherein the control unit operates more than one cycle per second.

14. A circuit for connecting batteries, comprising:
a first energy storage unit with a positive terminal and a negative terminal,
a second energy storage unit with a positive terminal and a negative terminal,
a series configuration output and a parallel configuration output, and
an output terminal,
a plurality of switches connected to the terminals of the energy storage units and the output terminal, and
a control unit that controls the plurality of switches to regulate a cycle comprising a first phase and a second phase,
wherein during the first phase, the negative terminal of the first energy storage unit is connected to the positive terminal of the second energy storage unit, while the positive terminal of the first energy storage unit and the negative terminal of the second energy storage unit are connected to the output terminal, such that the first energy storage unit, second energy storage unit, and output terminal are connected in a series connection; and
wherein during the second phase, the positive terminal of the first energy storage unit is connected to the positive terminal of the second energy storage unit while the negative terminal of the first energy storage unit is connected to the negative terminal of the second energy storage unit and both the positive terminals are connected to the output terminal and the negative terminals are connected to the output terminal, such that the first energy storage unit, second energy storage unit, and output terminal are connected in parallel; and
a plurality of switches connected to the positive and negative terminals of the energy storage units, such that the switches configure the circuit in a series configuration during the first phase, and then in a parallel configuration during the second phase;
wherein the control unit alters the relative duration of the first phase and the relative duration of the second phase, such that the first phase comprises 0% to 100% of the duration of the cycle, and the second phase comprises the remainder of the cycle, such that the control unit alters the relative duration of the series configuration output and the parallel configuration output, and
wherein an output of the output terminal is determined as a weighted average between the series configuration output and the parallel configuration output, wherein the weighted average is weighted based on the relative duration of the first phase and the relative duration of the second phase.

15. The circuit of claim 14, wherein the plurality of switches are interconnected such that they are flipped or change position simultaneously.

16. The circuit of claim 14, wherein the output terminal further comprises a switch that switches between two or more output devices every phase.

17. The circuit of claim 14, wherein the control unit alters the durations of the first phase and the second phase to produce a specific output voltage and current.

18. The circuit of claim 14, wherein the switches are transistors.

* * * * *